US006182196B1

(12) United States Patent
DeRoo

(10) Patent No.: US 6,182,196 B1
(45) Date of Patent: Jan. 30, 2001

(54) METHOD AND APPARATUS FOR ARBITRATING ACCESS REQUESTS TO A MEMORY

(75) Inventor: John E. DeRoo, Hopkinton, MA (US)

(73) Assignee: ATI International SRL, Hastings (BB)

( * ) Notice: Under 35 U.S.C. 154(b), the term of this patent shall be extended for 0 days.

(21) Appl. No.: 09/186,037

(22) Filed: Nov. 4, 1998

Related U.S. Application Data

(63) Continuation-in-part of application No. 09/026,942, filed on Feb. 20, 1998.

(51) Int. Cl.[7] .............................. G06F 12/00; G06F 13/00
(52) U.S. Cl. ........................... 711/144; 711/141; 711/151
(58) Field of Search ....................... 710/40–45, 113–125, 710/240–244, 53, 54; 711/150–151, 168–169

(56) References Cited

U.S. PATENT DOCUMENTS 4,928,234 * 5/1990 Kitamura et al. ..................... 364/200
5,197,130 * 3/1993 Chen et al. ........................... 395/325
5,450,564 * 9/1995 Hassler et al. ....................... 395/495
5,860,159 * 1/1999 Hagersten ............................ 711/151
5,920,898 * 7/1999 Bolyn et al. ......................... 711/167

* cited by examiner

Primary Examiner—John W. Cabeca
Assistant Examiner—Pierre M Vital
(74) Attorney, Agent, or Firm—Markison & Reckamp, P.C.

(57) ABSTRACT

A method and apparatus for arbitrating access requests to a memory is accomplished which allows for the serialization of the memory access requests, when a memory access collision is detected. A memory access collision is detected when contemporaneous accesses to an identical memory block of the memory occur. Processing begins when a plurality of operations are received via a plurality of parallel pipelines, wherein at least some of the plurality of operations require memory access. The plurality of parallel pipelines are then monitored for memory access collisions. At least some of the plurality of pipelines are then serialized when a memory access collision is detected to ensure proper processing order of the plurality of operations involved in the memory access collision.

17 Claims, 8 Drawing Sheets

METHOD AND APPARATUS FOR ARBITRATING ACCESS REQUESTS TO A MEMORY

RELATED APPLICATIONS

This is a continuation in part of co-pending patent application entitled "Method and Apparatus for Assuring Cache Coherency," having a Ser. No. of 09/026,942 pending, a filing date of Feb. 20, 1998, and assigned to the same assignee as the present invention.

TECHNICAL FIELD OF THE INVENTION

The present invention relates generally to the use of cache memory and more particularly to a method and apparatus for arbitrating multiple access requests to an identical memory block of memory.

BACKGROUND OF THE INVENTION

Computers are known to include a central processing unit, audio processing circuitry, peripheral ports, video graphics circuitry, and system memory. Video graphic circuits, which include cache memory, are utilized in computers to process images for subsequent display on a display device, which may be a computer monitor, a television, a LCD panel, and/or any other device that displays pixel information. The cache memory is used to optimize computer system performance by temporarily storing data in memory devices that allow for high speed data access, in comparison to data retrieval from low speed memory devices such as system memory, disks or tapes. Cache memory is used as temporary storage for data typically contained in lower speed memory so that each processor access to the data is to the cache memory, as opposed to the lower speed memory, thereby avoiding the latency associated with an access to the lower speed memory.

The initial access to the data incurs the latency time loss to access the data from the low speed memory because the data is transferred from the low speed memory to the cache. Once that data is stored in the cache, however, subsequent accesses to the data are at the high speed cache access rate. Cache memory is conventionally structured to provide access to multiple blocks of memory. FIG. 1 represents a conventional processing system that includes indexed cache memory. As shown, cache locations C0, C1, C2, and C3 form cache memory areas within a cache memory 130. Each of these cache locations is capable of storing a copy of a block of memory A, B, C, etc. of memory 100. The client 110 (e.g. a processor or application performed by a processor) accesses data contained in the memory 100 via the memory access system 120. The client 110 communicates a stream of data commands 115 via the command bus 112, and the data associated with the command stream 115 is communicated via the data bus 111. By storing copies of the blocks of memory in the cache memory, substantial access speed improvements can be achieved when multiple accesses to the data occur.

The data commands from the client 110 are received by the operation generator 140 within the memory access system 120. The client data commands direct a transfer of data to or from a memory address. Such commands may be a read, write, or a read-modify-write (read/write). The operation generator 140 generates a series of commands applicable to the memory control 160 and the memory 100 to accomplish each client data command. The operation generator 140 interprets the data command to determine which memory block A, B, C, etc. of memory 100 includes the requested memory address. It also determines whether a copy of the identified memory block is already contained in the cache memory 130. If the memory block is contained in the cache memory, the operation generator identifies which cache location C0, C1, etc. contains the copy of the memory block, and formulates a command to effect the data command with this identified cache location.

If the memory block is not contained in the cache memory, the operation generator 140, allocates one of the cache locations for this memory block. Typically, the allocated cache location will have been allocated to another memory block prior to this data command. Therefore, the operation generator must determine whether some action must be taken with regard to the data currently stored in the identified cache location. If, for example, the copy of the data in the cache location had only been used for reading the data contained in a memory block, no action need be taken. The new memory block data will merely overwrite the prior data. If, however, new data had been written to this cache location, intending to be written to the associated memory block, the copy of the data in the cache location must be written to the memory block before the new memory block data is read into this cache location. Thus, in this case, the operation generator 140 will formulate a command to write the data in the cache location to its previously associated memory block, followed by the command to read the new memory block into this cache location. The command to write data from the cache location to the memory is termed a "flush" of the cache location; the command to read data into the cache location from the memory is termed a "fill" of the cache location.

When the cache memory 130 is full and another request arrives, the operation generator 140 allocates one of the cache locations to the new request. A variety of allocation algorithms can be applied to determine which cache location is to be reallocated, such as lest recently used algorithms, indexed algorithms, etc. Before the operation generator 140 reallocates one of the cache locations, it first determines that the data contained in the cache location is no longer needed. Typically, the data will be needed if it has been modified and the modifications have not been written back to memory. If the data has not been written back to memory, the new data request cannot be processed in the cache location until the modified data has been written back to memory. While this writing occurs, the processing of the data request is halted, which, depending on the nature of the data, may completely halt the processing of the computer system.

A problem that can arise is a situation known as "thrashing." Thrashing occurs when the operation generator 140 is constantly filling and flushing the cache memory 130 in accordance with the data commands (client operation requests) 115. Thrashing may better be described as the case where the cache is frequently filling and flushing the same memory locations over and over again. For example, assume a cache has 4 entries. The client issues read commands to the following locations: A, B, C, D, E, A, B, C, D, E, A, . . . etc. In order to do the fill for the first request of E, the data for A must be cleared out to make room in the four-entry cash, which contains A, B, C, D at that point. But then A must be brought right back in again when the second request for A is processed.

Thrashing is heightened if multiple clients begin to initiate fill and flush commands to be processed by the operation generator 140. In a multiple client system, if the processing order of the fill and flush commands is incorrect, errors may occur. For example, a command to flush modified data may be followed by a command to fill the same memory block. If the fill and flush commands are processed asynchronously and in parallel, the fill may occur before the flush. If the fill occurs before the flush, the modified data in the cache location will be overwritten by the data filled from memory, resulting in errors. Additionally, if multiple clients begin to initiate fill and flush commands directed toward the same memory block at the same time, the likelihood that collisions may occur between these commands is greatly increased. As such, errors may occur that degrade the quality of various computer applications such as video games, drawing applications, painting applications, broadcast television signals, cable television signals, etc., that utilize a video graphics circuit.

Therefore, a need exists for a method and apparatus for arbitrating access requests to a memory when contemporaneous accesses to an identical memory block of the memory occur. A need also exists for a method and apparatus for controlling parallel pipeline memory accesses, which allows for the serialization of the memory access requests when a memory access collision is detected.

DETAILED DESCRIPTION OF A PREFERRED EMBODIMENT

Generally, the present invention provides a method and apparatus for arbitrating access requests to a memory when contemporaneous accesses to an identical memory block of the memory occur. Additionally, the present invention provides a method and apparatus for controlling parallel pipeline memory accesses, which allow for the serialization of the memory access requests when a memory access collision is detected. A memory access collision is detected when contemporaneous accesses to an identical memory block of the memory occur. Such processing begins by receiving a plurality of operations via a plurality of parallel pipelines, wherein at least some of the plurality of operations require memory access. The plurality of parallel pipelines are then monitored for memory access collisions. At least some of the plurality of pipelines are then serialized when a memory access collision is detected to ensure the proper processing order of the plurality of operations involved in the memory access collision.

In a video graphics circuit, clients such as a source and a destination (e.g. a computer and/or a server) send access requests in a parallel manner and, based on the access requests, access particular memory blocks of memory. Often, the source and destination may attempt to contemporaneously access an identical memory block. For example, if the access requests are sent in order to move a window across a monitor, the destination may attempt to read a memory block A of the window from frame N of the monitor and the source may attempt to write the same memory block A of the window to the frame N+1 of the monitor. In this situation, the destination is reading from, and the source is writing to, the same memory block at the same time resulting in a collision between the read and write access requests. An arbitration rule is then used to produce a first memory access request and a second memory access request where the first memory access request is processed with priority over the second memory access request in a serial manner until the conflict is resolved. Once the conflict is resolved, the access requests are again processed in a parallel manner.

With such a method and apparatus, problems associated with contemporaneous accesses to an identical block of memory and problems associated with controlling parallel pipeline memory accesses are solved.

Figure 1:
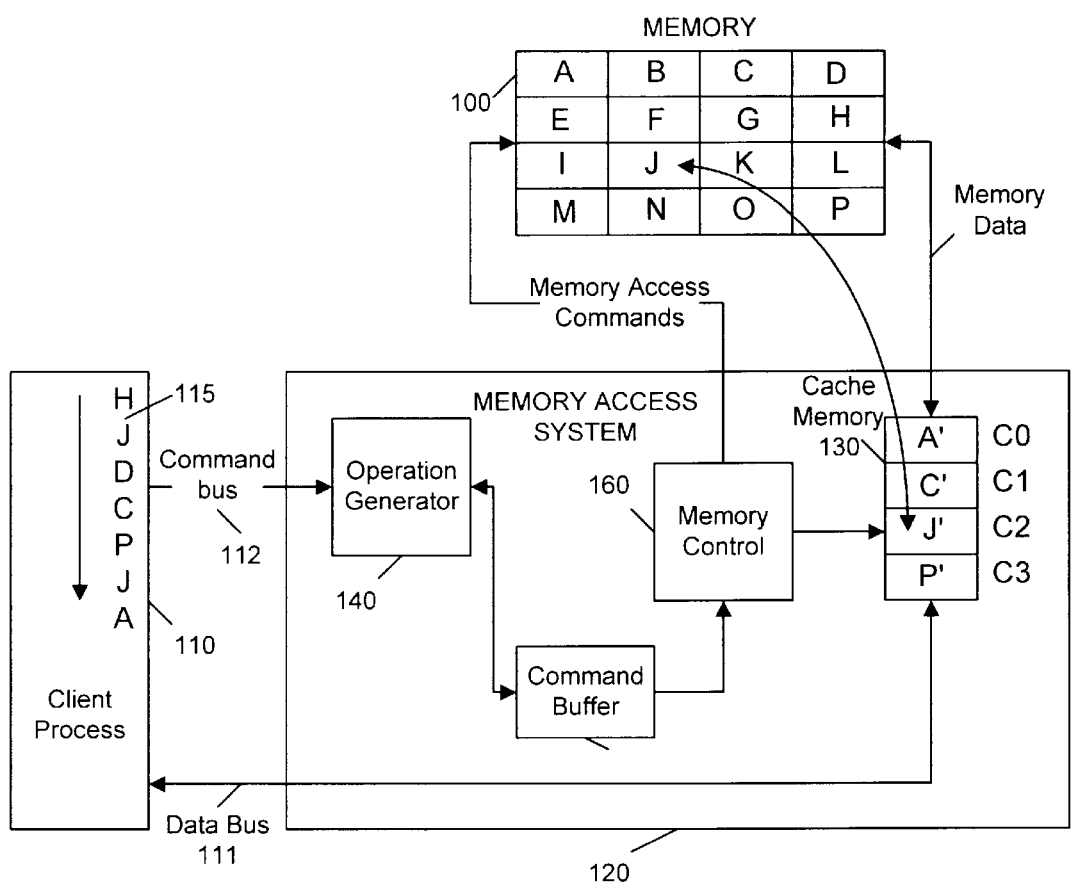
FIG. 1 illustrates a block diagram of a conventional cache memory access system.
Figure 2:
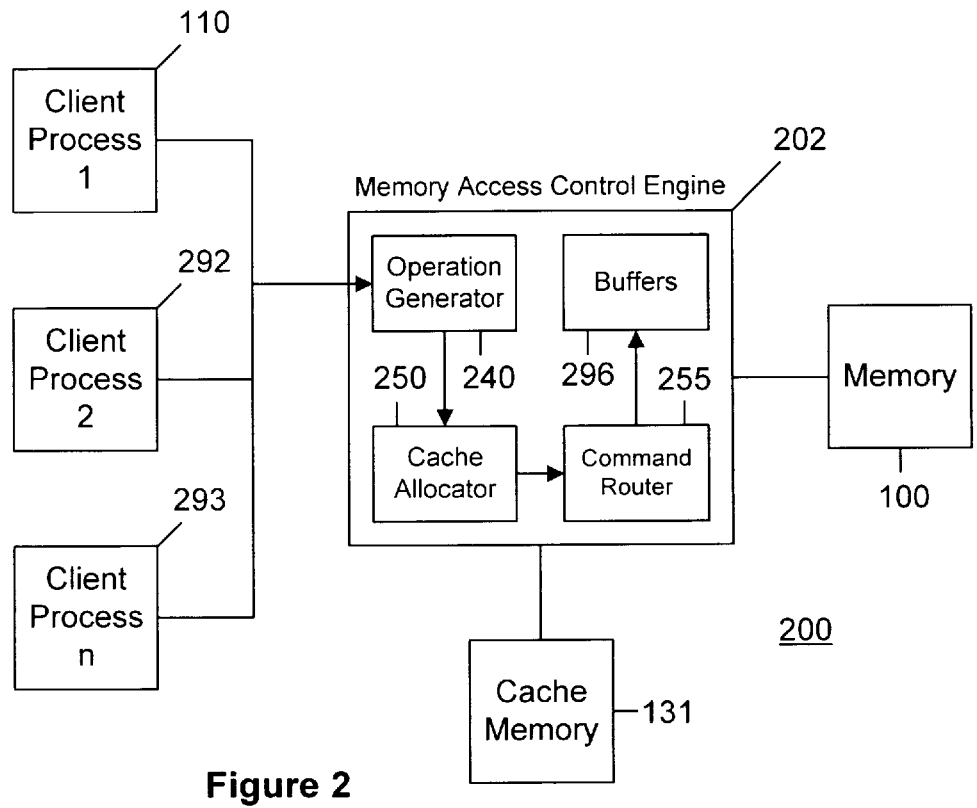
FIG. 2 illustrates a block diagram of a cache memory access system in accordance with the present invention.

The present invention can be more fully described with reference to FIGS. 2–10. FIG. 2 illustrates a block diagram of a cache memory access system 200 which includes clients (or client engines) 110, 292, and 293, memory access control engine 202, memory (or main memory) 100 and cache memory 131. The clients 110, 292, and 293 may be central processing units within a personal computer, laptop computer, and/or workstation, or may be stand-alone processing devices. Such stand-alone processing devices include micro-processors, micro-controllers, digital signal processors, any other device that manipulates digital information based on programming instructions, and/or applications running on such a device. Additional clients that may reside in a system include portions of a graphics processing system that require access to memory. The clients 110, 292, and 293, are sending client operation requests, which require memory access, to the memory access control engine 202, in regard to a particular application. These requests achieve an intended result based on the current application. For example, an application such as a video game that utilizes a video graphics card may request memory accesses to produce an intended image on a monitor and/or may request memory accesses in response to a user's command. In this scenario, client 110 may process the commands of a player 1; client 292 may process the commands of a second player 2, and client 293 may process the background of the video game as the game progresses. The clients 110, 292, and 293, are processing their respective commands individually but in parallel to produce a seamless image on the monitor. However, through their parallel processing, the clients 110, 292, and 293 may attempt to access an identical memory block of memory (i.e. memory 100 and/or cache memory 131) at the same time. If two or more of the client processes 110, 292, and 293 attempt to access an identical memory block of memory at the same time, an arbitration rule is used to process the first memory access request with priority over the second memory access request. A description of the arbitration rule will be provided in reference to FIGS. 7 and 8. The memory 100 and/or cache memory 131 is accessed via the memory access control engine 202 which contains an operation generator 240, a cache allocator 250, a command router 255, and buffers 296. A description of the operation generator 240, cache allocator 250, command router 255, and buffers 296 will be provided in reference to FIG. 4.

Figure 3:
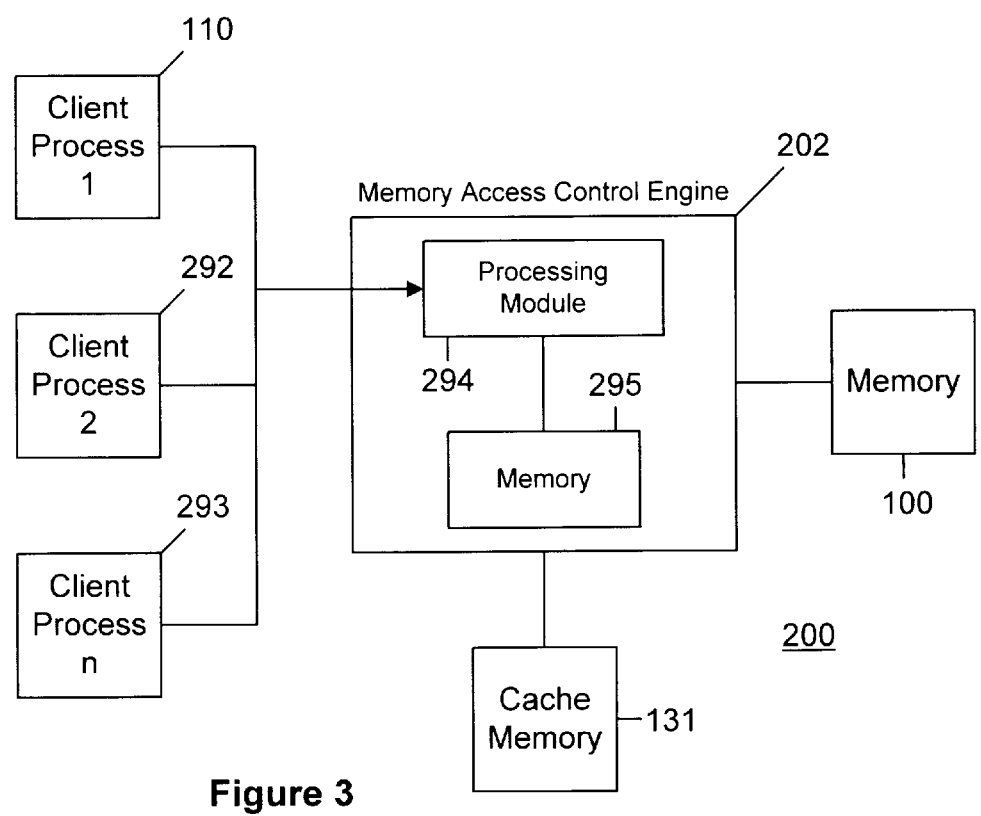
FIG. 3 illustrates an alternate embodiment of the cache memory access system in accordance with the present invention.

FIG. 3 illustrates an alternate embodiment of the cache memory access system 200 in which the memory access control engine 202 contains a processing module 294 and memory 295. The processing module 294 may be a single processing entity or a plurality of processing entities. Such a processing entity may be a microprocessor, microcomputer, microcontroller, digital signal processor, central processing unit, state machine, and/or any device that manipulates data based on operating and/or programming instructions. The memory 295 may be a single memory device or a plurality of memory devices. Such a memory device may be system memory, local memory, random access memory, read only memory, hard disk memory, magnetic tape memory, and/or any device that stores data.

The processing module 294, performs a function similar to the operation generator 240, cache allocator 250, command router 255, and buffers 296. The memory includes operational instructions that cause the processing module 294 to arbitrate between two or more attempts to access an identical memory block of memory at the same time. It will also be apparent to those skilled in the art that more than three clients can be active at the same time and that the cache memory 131 may be included in the memory access control engine 202.

Figure 4:
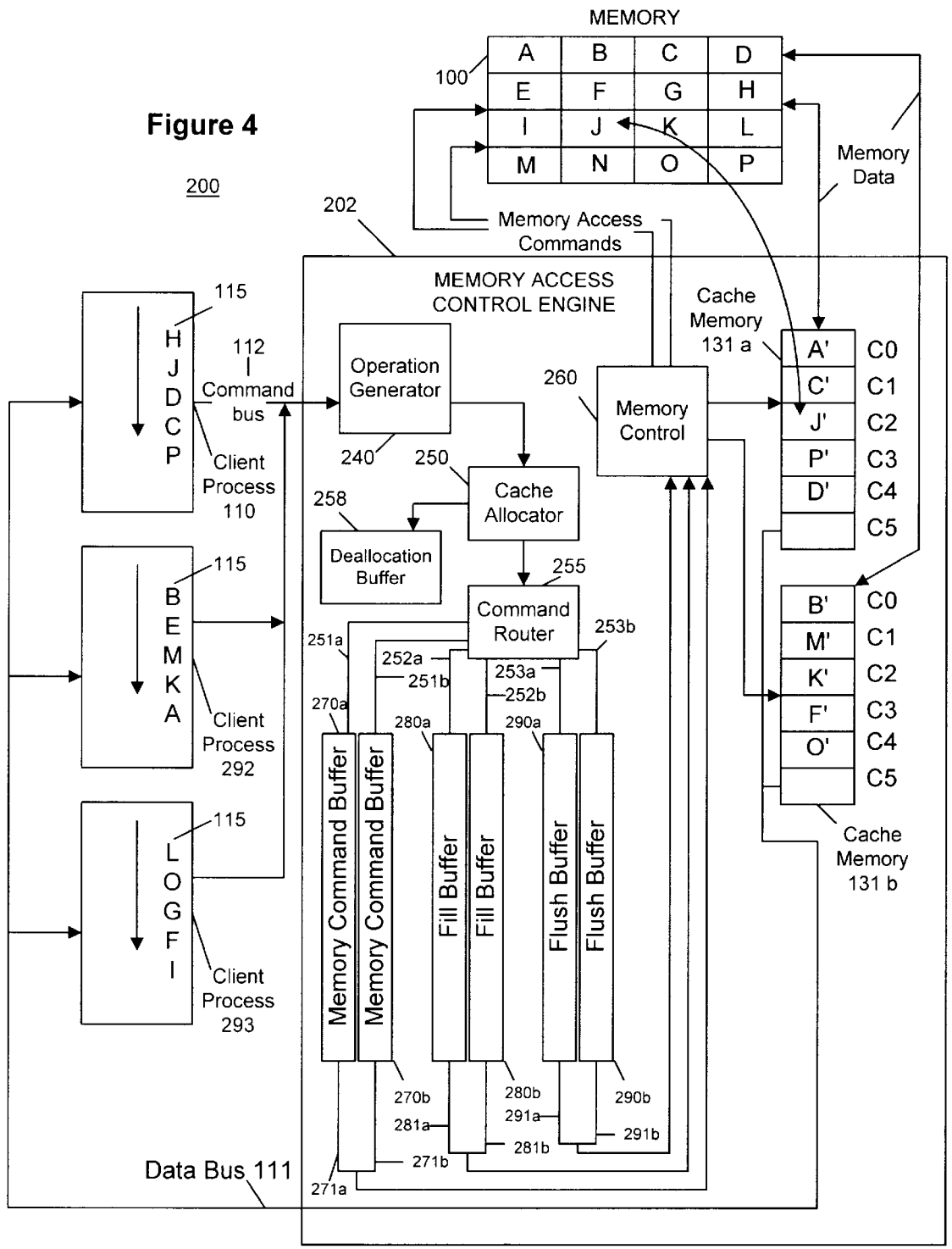
FIG. 4 illustrates a block diagram of a memory access control engine in accordance with the present invention.

FIG. 4 illustrates a schematic block diagram of the cache memory access system 200 that includes clients, or client processes, 110, 292, and 293, memory access control engine 202, and memory 100. Memory access control engine 202 includes a cache memory 131a, a cache memory 131b, an operation generator 240, a cache allocator 250, a command router 255, a deallocation buffer 258, a memory control block 260, and a plurality of buffers. The operation generator 240 receives a plurality of client operation requests from the clients 110, 292, and 293 via the command buses (or parallel pipelines) 112. The operation generator 240 formulates, therefrom, commands with reference to logical cache indices to the cache memories 131a and 131b (herein after referred to as cache memories 131), rather than a reference to a specific cache location.

The cache memories 131 may only include a single block of cache memory. Providing multiple blocks of cache memory that make up the cache memories 131 allows for multiple reads and writes to occur in parallel. It should be apparent to one skilled in the art that numerous memory combinations are possible that would suit the needs of the particular cache system.

The cache memories 131 represent two separate cache memories that receive memory access requests via two separate ports. This allows the memory access control engine 202 to, for example, flush memory blocks from cache memory 131a while at the same time fill memory blocks to cache memory 131b. In this manner, the processing of memory blocks is made more efficient because the operations can occur in parallel. However, in a conventional cache memory such as a dual-port RAM (which includes a single memory with dual ports), flushing from and filling to the same memory block has a greater potential of occurring. If allowed to occur, the data contained in the memory block may be corrupted if the flushing and filling are not done in an appropriate order. The cache memories 131, though, may still experience the problem of having a collision with the plurality of client operation requests when they contemporaneously attempt to access an identical memory block. This situation will be described in greater detail in reference to FIGS. 7 and 8.

The operation generator 240 determines when a new allocation of cache is required to satisfy a current client operation request. This information (i.e. when a new allocation of cache is required) is communicated to the cache allocator 250. This new allocation, however, is a new allocation of the aforementioned logical cache index, rather than an allocation of an actual cache location. The cache allocator 250 allocates a free physical cache index to the logical cache index. A physical cache index is associated with each physical cache location C0, C1, C2, etc. The free physical cache index is associated with a cache location that does not have any outstanding operations pending. The prior association of a memory block to a physical cache index is retained in a deallocation buffer 258 until the operations related to the cache location identified by the physical cache index are completed. In this manner, new client operation requests are not delayed while the data related to the prior client operation requests are cleared from the cache location.

If a free physical index is not available at the time the client operation request reaches the cache allocator 250, the client operation request is held pending until a cache location and its associated physical index become free. Spare cache locations C5 (cache locations in excess of the number of logical indexes) are provided to increase the likelihood of a free cache location being available, thereby minimizing the likelihood of having to hold a command. When all operations on the memory block and cache location associated with a physical index in the deallocation buffer 258 are completed, the cache allocator 250 severs the association and marks the cache location and associated physical index as being free.

The command router 255 routes the commands generated by the operation generator 240, as modified by the cache allocator 250, to buffers 270a, 270b, 280a, 280b, 290a, and 290b. The commands are routed depending on the command type (i.e. read, write, fill, or flush) and the cache memory 131a or 131b that contains, or is to contain, the requested memory block. Memory commands (read and write commands) are stored in client read/write buffers 270a and 270b via paths 251a and 251b; fill commands are stored in fill buffers 280a and 280b via paths 252a and 252b; and, flush commands are stored in flush buffers 290a and 290b via paths 253a and 253b. The commands are routed to client read/write buffer 270a, fill buffer 280a, and/or flush buffer 290a if the requested memory block is contained in cache memory 131a. Conversely, the commands are routed to client read/write buffer 270b, fill buffer 280b, and/or flush buffer 290b if the requested memory block is contained in cache memory 131b. From the buffers, the commands are received by the memory control block 260 via paths 271a and 271b, 281a and 281b, and, 291a and 291b. Although the paths (such as 271a and 271b) are shown to be combined, one skilled in the art will appreciate that the paths could be individually coupled to the memory control block 260.

The operation generator 240 formulates a fill command whenever a read from a new memory block is required. This "new" memory block is a new assignment of this memory block to a logical index. It may well be that the memory block is still contained, in an unmodified form, in one of the cache locations from a prior access. Before assigning a free cache location to this logical index, the cache allocator 250 searches the deallocation buffer 258 to determine if the block is still associated with a physical cache index. If it is, the physical cache index is reallocated to the logical index, the entry in the deallocation buffer 258 may be removed or marked such that it is not deallocated, and the fill command is propagated to the command router 255 and the fill buffer 280. If the memory block is not currently in the cache memories 131, the cache allocator 250 assigns one of the free physical indexes to the logical index, and submits a fill command to the command router 255. The command router 255 routes the fill command to the fill buffers 280*a* or 280*b*, instructing that the cache location at this index is to be filled from the memory block associated with the logical index. In an alternate embodiment, a read valid indicator is passed along with flush commands and indicates that the fill is not necessary.

Thus, a fill will be directed to a free cache location, and no operation can be pending for this memory block. Therefore, fill commands can be executed without waiting for another command to complete. The fill buffers 280*a* and 280*b* cannot be deadlocked and cannot be delayed by other commands. Since the fill commands are independent, they may be processed by the memory controller 260 without regard to a particular ordering of the commands. Since a fill from memory 100 is much slower than a read from the cache memories 131, performance of client operations may be compromised. Memory access is thereby optimized because the fill commands are not delayed in a queue behind other non-fill commands.

A read or write command is formulated in response to a read or write data command of the client operation requests 115 from the clients 110, 292, and 293. The operation generator 240 formulates the read and write commands with reference to the data location in cache memories 131. To ensure that the proper data is read from the cache location, the read command should not be executed if there is either a prior write or fill pending for this cache location. A read will not be executed if a prior write is pending. Typically, the memory commands to the same cache location are processed in the order in which they are received. Thus, the prior write command will be known to have been initiated before the read command. Read and write commands transfer data to and from the cache memories 131 via the data bus 111. As such, they execute quickly. This allows the commands from the client read/write buffers 270*a* and 270*b* to be executed sequentially, such that one command is not executed until the prior command is completed, thereby preserving data coherency without adversely affecting system performance. As previously mentioned, however, the problem of having a collision with the plurality of client operation requests when they contemporaneously attempt to access an identical memory block may still be experienced.

A read command will not be executed until the fill command to its assigned cache location is completed. Since fill commands are completed as quickly as the memory 100 allows, the read command will be processed efficiently. Although subsequent reads will be delayed in the client read/write buffer 270 by any delay incurred waiting for the initial fill, the subsequent reads may have been submitted immediately after the initial read, and therefore may avoid similar delays experienced by the initial fill or read operation. Additional delays may be avoided if the initial fill operation fetches a block of memory that contains data needed by subsequent read operations. In such cases, the data will be present in the cache and an additional fill operation will not be required.

Upon completion of all outstanding operations on a cache location and memory block identified in the deallocation buffer 258, the physical index is marked as being free. If, after being identified as a deallocated block, a subsequent command affects the memory block, the memory block will be removed from the deallocation buffer 258, and the physical index will be allocated to a new logical index. Thus, a free cache location will only be requested for a new memory block access.

Figure 5:
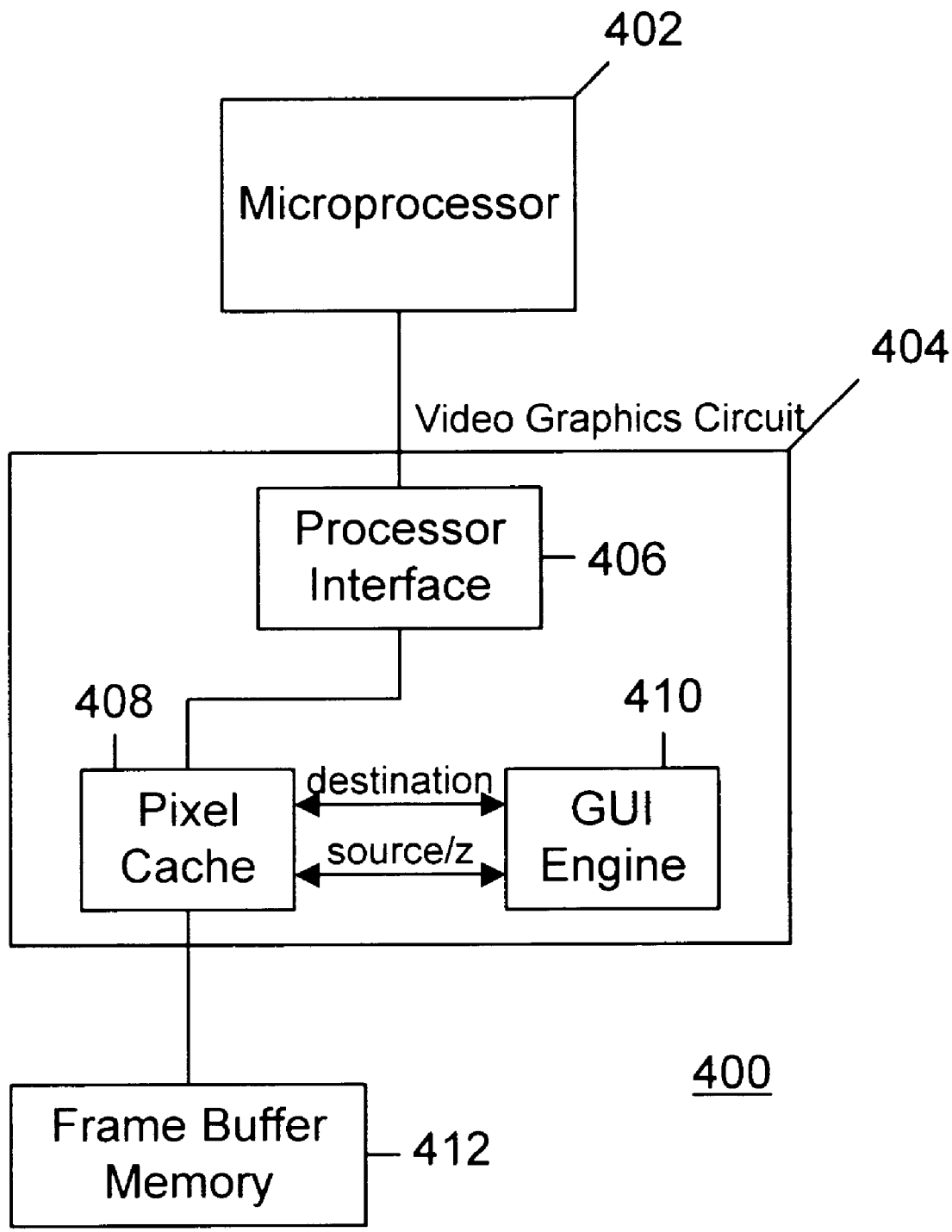
FIG. 5 illustrates a block diagram of a video graphics circuit in accordance with the present invention.

FIG. 5 illustrates a system 400 that includes a video graphics circuit 404, which may be implemented as an integrated circuit, as modified in accordance with the present invention. In video graphics processing, as a central processing unit processes a computer application, it provides image data (i.e. object parameters) to a video graphics circuit, which, in turn, processes the image data and provides the processed image data to a monitor. At a minimum, the image data provided by the central processing unit includes physical coordinates of an object with respect to the display coordinates and color information. Such basic image data is typical for two-dimensional images of word processing applications, drawing applications, presentation applications, etc. For more complex display options, such as three-dimensional imagery, the image data may further include texture coordinates, alpha blending parameters, and/or bump map coordinates. The texture coordinates correlate the object to a particular texture map such that the object's surface has a pattern of the texture map while the alpha-blending parameters indicate the translucency of the object. The bump map coordinates relate the object to a bump map, which includes a topographical representation of roughness that may be imposed upon the surface of the object.

The video graphics circuit 404, may be equivalent to a video graphics circuit found in the RagePro ® from ATI International SRL (ATI Technologies) as modified by the present invention. The video graphics circuit 404 contains a processor interface 406, a pixel cache 408, and a GUI engine 410. A microprocessor 402 provides the processor interface 406 with commands that contain memory access requests from the video graphics circuit 404 to produce an intended image on a monitor. The processor interface 406 routes the commands to the pixel cache 408 which performs a function similar to the memory access control engine 202 of FIG. 4 described above. Thus, the microprocessor 402 can read and write memory blocks to and from the frame buffer memory 412 through the pixel cache 408 (if the memory blocks are not already in the pixel cache 408). The frame buffer memory 412 performs a function similar to the memory 100 of FIG. 4 described above. The graphical user interface (GUI) engine 410 receives the memory blocks over two different channels, a source/z channel and a destination channel. The source/z channel and the destination channel allow 3D access to some data blocks by the microprocessor 402 and the GUI engine 410. The GUI engine 410 determines the graphics operations (such as moving images on the monitor, changing colors, etc.) which are to be performed and performs those operations based on the memory blocks received. The results of the operations performed are reflected on a monitor. A cross check is performed between the source/z path and the destination path to determine if the client operation requests are contemporaneously attempting to access an identical memory block. A description of the cross check will be provided in reference to FIG. 6.

Figure 6:
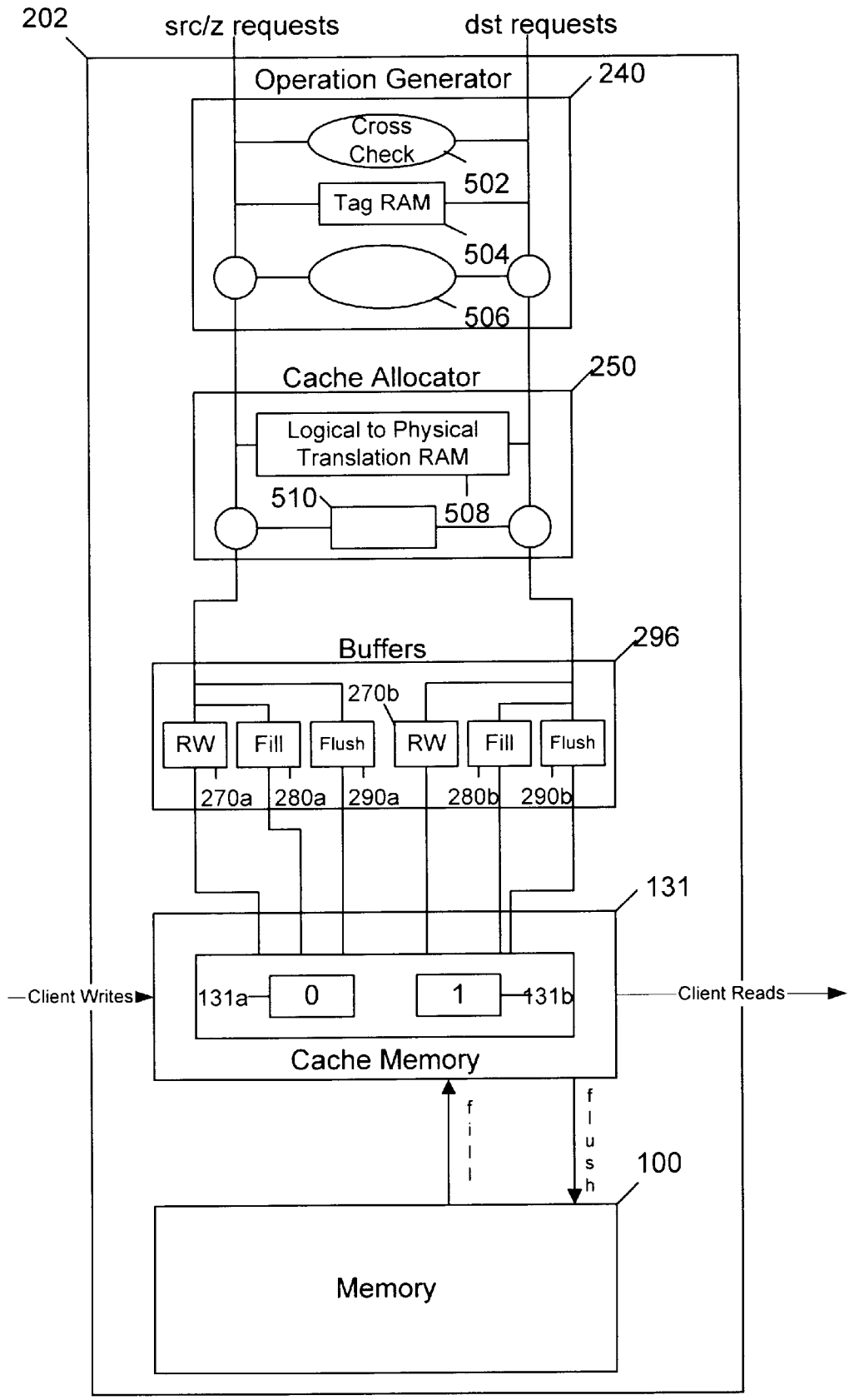
FIG. 6 illustrates a functional block diagram of the memory access control engine in accordance with the present invention.

FIG. 6 illustrates the processing of client operation requests in the memory access control engine 202. The client operation requests, such as a read, write, or read-modify-write (read/write), which are sent from the clients 110, 292, and 293, are received by the operation generator 240 via the source/z path and the destination path. The operation generator 240 includes a cross check module 502, a tag RAM 504, and a buffer 506. When the client operation requests are received by the operation generator 240 via the source/z path and the destination path, they are "linked" together and passed through the cross check module 502. The cross check module 502 compares the client operation requests to see if they are contemporaneously attempting to access an identical memory block of memory. If not, the client operation requests are forwarded through the operation generator 240 via the source/z path and the destination path without any arbitration. In this instance, the order in which the client operation requests are forwarded in the operation generator 240 for eventual processing by the rest of the memory access control engine 202 is not critical.

If, however, the cross check module 502 compares the client operation requests and determines that they are contemporaneously attempting to access an identical memory block of memory, the cross check 502 arbitrates between the client operation requests. The arbitration is based on an arbitration rule and produces a first memory access request and a second memory access request. A description of the arbitration rule will be provided with reference to FIGS. 7 and 8. In this instance, the first memory access request (e.g. source request) is processed with priority over the second memory access request (e.g. destination request). As such, the first memory access request and the second memory access request are processed in a serial manner. Thus, the order in which the memory access requests are forwarded in the operation generator 240 for eventual processing by the rest of the memory access control engine 202 is determined by the arbitration rule. This order will be maintained in the operation generator 240 and in the cache allocator 250 until the memory access requests are received in the buffers 296 for processing (which will be discussed below).

The client operation requests are then received by the tag RAM 504. The client operation requests include the type of operation request (i.e. read, write, or read/write), the memory address which addresses a memory location within the memory block, the logical cache address the memory address maps to, and a fill bit associated with the logical cache address. Using a portion of the memory address (e.g. the first 4 bits), the associated line of the memory address in the tag RAM 504 is accessed to determine if the memory block is in the cache memories 131. If the memory block is not in the cache memories 131 (i.e. the memory address and the associated line of the memory address in the tag RAM 504 do not match), the client operation request is sent to a buffer 506 for processing. The memory block may not be in the cache memory 131 because the cache memory 131 is full or the memory block has not previously been written into the cache memory 131.

If the cache memory 131 is full, the operation generator 140 deallocates an existing memory block of one of the cache locations and allocates the cache location to the memory block based on the new client operation request. A variety of allocation algorithms can be applied to determine which cache location is to be reallocated, such as lest recently used algorithms, indexed algorithms, and others. If the memory block has not previously been written into the cache memory 131 (i.e. the physical cache location does not contain data of the memory block) the fill bit associated with the logical cache address is set. When the fill bit is set, the cache allocator 250 determines whether the physical cache locations 131a and 131b have an available cache block. When the physical cache location has an available cache block, the client operation request is sent to the buffers 296. When the operation request, for example a read operation request, is received by buffers 296, the fill buffer 280a or the fill buffer 280b fills the available cache block with data from the memory block in memory 100. The fill buffer 280a will fill the available cache block if the first memory access request was sent via the source/z path. Conversely, the fill buffer 280b will fill the available cache block if the first memory access request was sent via the destination path.

If the memory block is in the cache memory 131 (i.e. the memory address and the associated line of the memory address in the tag RAM 504 match) the logical cache address is sent to the cache allocator 250. The cache allocator 250 includes a logical to physical translation RAM 508 and a buffer 510. The logical cache address is received by the logical to physical translation RAM 508 where the logical cache address is mapped to the physical cache location that contains the memory block. The client operation request is then sent to the buffers 296 where the fill buffer 131a or the fill buffer 280b fill the data from the physical cache location in the cache memory 131 that contains the memory block (i.e. physical cache location zero 131a or physical cache location one 131b). As described above, the fill buffer 280a will fill the available cache block if the first memory access request was sent via the source/z path. Conversely, the fill buffer 280b will fill the available cache block if the first memory access request was sent via the destination path.

The similar buffers (i.e. fill buffer 280a and fill buffer 280b) in buffers 296, are monitored in the event parallel pipeline sequencing discrepancies occur. When a parallel pipeline sequencing discrepancy is detected, the client operation requests involved in the sequencing discrepancy are sent to the buffer 510. In the buffer 510, the parallel pipeline processing of the similar buffers are adjusted so that the fill requests are processed in an appropriate order.

The second client operation request is then processed by determining the type of operation request (i.e. read, write, or read/write) to be initiated. Since the logical cache address has already been mapped to the physical cache location that contains the memory block, the second client operation request utilizes this logical cache address for processing based on the operation request to be initiated on the memory block.

Figure 7:
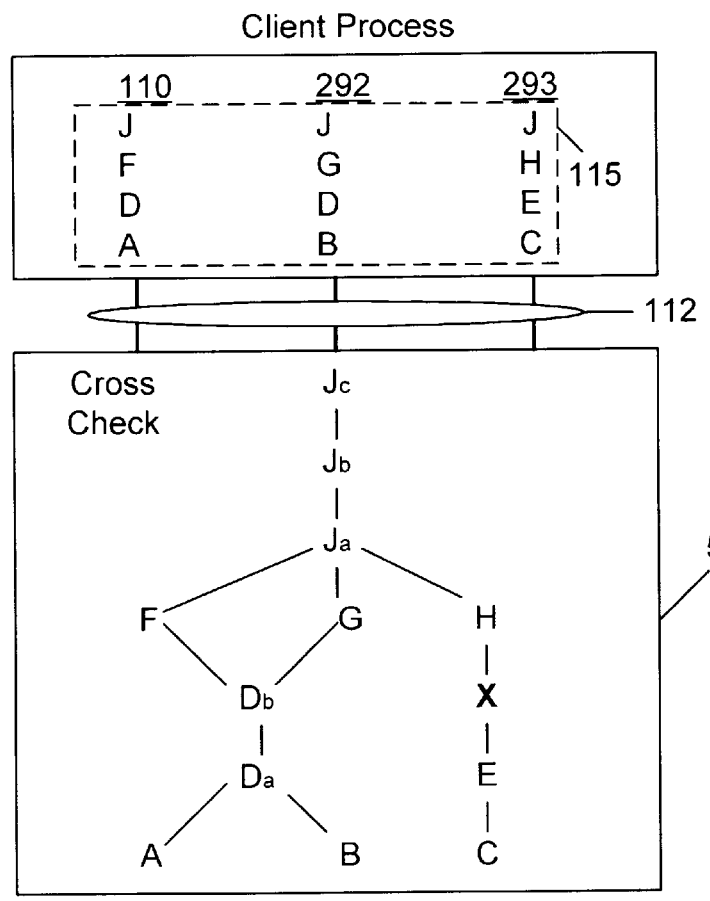
FIG. 7 illustrates a block diagram of the arbitration performed in the cross check in accordance with the present invention.

FIG. 7 describes the arbitration performed in the cross check module 502. The clients 110, 292, and 293 forward client operation requests 115 to the cross check module 502 via the command bus (or parallel pipelines) 112. As the cross check module 502 receives the client operation requests 115, it determines if two or more clients are contemporaneously attempting to access an identical memory block of memory via the client operation requests 115. If two or more client operation requests 115 are not contemporaneously attempting to access an identical memory block of memory, the cross check 502 processes the client operation requests 115 in parallel. For example, client 110 is attempting to access a memory block A; client 292 is contemporaneously attempting to access a memory block B; and client 293 is attempting to access a memory block C. The cross check module 502 receives these client operation requests 115 and, since the client operation requests 115 are not attempting to access the same memory block, the cross check module 502 allows them to be processed in a parallel manner. The client 110 then attempts to access a memory block D; client 292 also attempts to access the memory block D; and client 293 attempts to access a memory block E. The cross check module 502 receives these client operation requests and, since client 110 and client 292 are contemporaneously attempting to access an identical memory block of memory (i.e. D), the cross check module 502 arbitrarily allocates the first client operation request to client 110 or client 292. In this example, the first client operation request is arbitrarily allocated to client 110 and the first client operation request is queued to produce a first queued operation. The second client operation request is allocated to client 292 and is subsequently queued to produce a second queued operation. The cross check module 502 then processes the first queued operation (i.e. $D_a$) and the second queued operation (i.e. $D_b$) in a serial manner. Since client 293 is attempting to access a memory block E, and not contemporaneously attempting to access memory block D, client operation request E is processed in parallel with client operation request $D_a$. After client operation request $D_a$ is processed, client operation request $D_b$ is processed before any other client operation request is processed so as to keep a proper processing order between the client operation requests. As such, an X is placed in the diagram to indicate that no processing is occurring while $D_b$ is processed.

Figure 8:
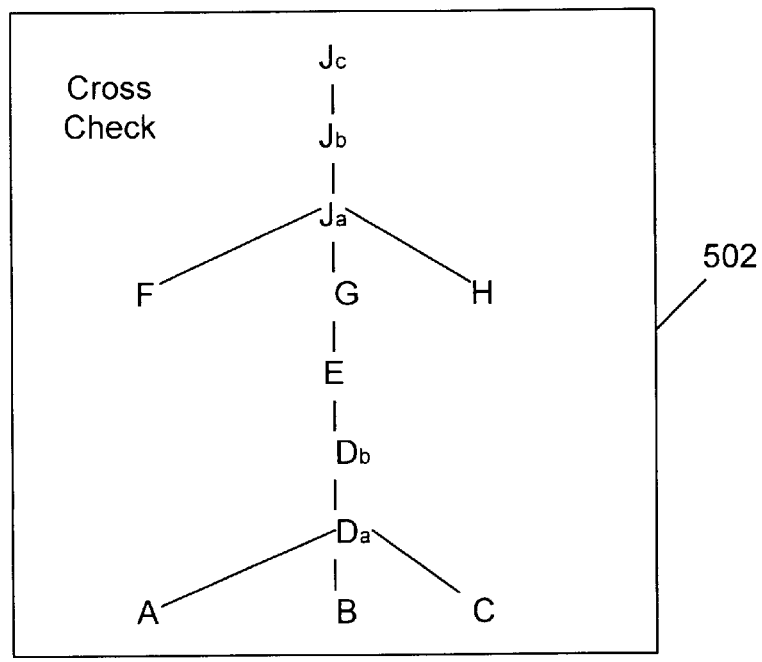
FIG. 8 illustrates an alternate embodiment of the arbitration performed in the cross check in accordance with the present invention.

FIG. 8, which illustrates an alternate embodiment of the arbitration performed in the cross check module 502, depicts the client operation request E being processed after the client operation request $D_b$ is processed. This is also done in order to keep a proper processing order between the client operation requests. Client operation requests F, G, and H are then processed in parallel and in a similar manner to client operation requests A, B, and C, as described above. When the cross check 502 receives the next three client operation requests, it determines that clients 110, 292, and 293, are each contemporaneously attempting to access memory block J. The first client operation request ($J_a$) and second client operation request ($J_b$) are handled in a similar manner to client operation requests $D_a$ and $D_b$ as described above. The third client operation request ($J_c$) is allocated to client 293 and is subsequently queued to produce a third queued operation. The cross check module 502 then processes the first queued operation ($J_a$), the second queued operation ($J_b$), and the third queued operation ($J_c$) in a serial manner. As one of average skill in the art will readily appreciate, the arbitration performed in the cross check module 502 could be performed in an alternate manner which, although not explicitly described or shown herein, embody the principles of the invention and are thus within its spirit and scope.

Figure 9:
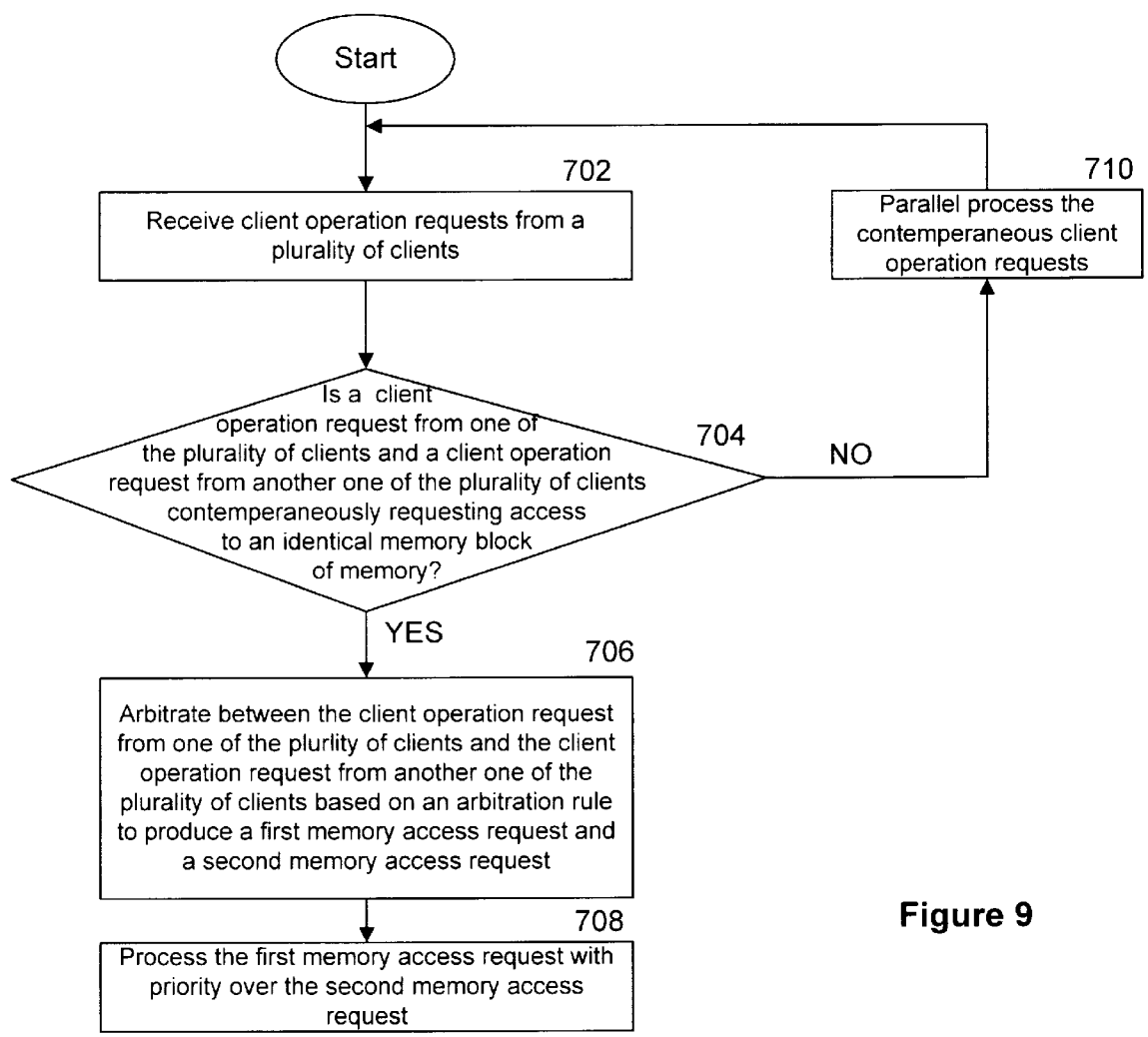
FIG. 9 illustrates a flow chart of a method for arbitrating access requests to a memory in accordance with the present invention.

FIG. 9 illustrates a flow chart for arbitrating access requests to a memory that may be performed by memory access control engine 202 and/or the video graphics circuit 404. The process begins at step 702 when client operation requests are received from a plurality of clients. At step 704, it is determined whether a client operation request from one of the plurality of clients and a client operation request from another one of the plurality of clients would cause contemporaneous access to an identical memory block. More specifically, a first set of buffers and a second set of buffers are monitored for parallel pipeline sequencing discrepancies, wherein the first set of buffers is associated with one of the plurality of clients and the second set of buffers is associated with another of the plurality of clients. The parallel pipeline processing of the first and second set of buffers is adjusted when a parallel pipeline sequencing discrepancy is detected.

If contemporaneous access to an identical memory block does not occur, the process proceeds to step 710 where the contemporaneous client operation requests are processed in parallel. If, however, the contemporaneous access to an identical memory block does occur, the process proceeds to step 706. At step 706, the client operation request from one of the plurality of clients and the client operation request from another one of the plurality of clients are arbitrated based on an arbitration rule to produce a first memory access request and a second memory access request when the client operation request from one of the plurality of clients and the client operation request from another one of the plurality of clients is requesting access to an identical memory block of memory.

At step 708, the first memory access request is processed with priority over the second memory access request. More specifically, the first memory access request is arbitrarily allocated to one of the plurality of clients. The first memory access request is then queued to produce a first queued client operation and the second memory access request is queued to produce a second queued client operation subsequently to the queuing of the first client operation request. A type of operation from the first memory access request is then determined and a memory address from the first memory access request is determined, wherein the memory address addresses a memory location within the memory block. The memory address is translated into a logical cache address, wherein the logical cache address relates to a physical cache location. It is then determined whether a physical cache location contains data of the memory block. When the physical cache location does not contain the data of the memory block, a fill bit associated with the logical cache address is set. It is then determined whether the fill bit is set. When the fill bit is set, whether the physical cache location has an available cache block is determined and, when the physical cache location has an available cache block, the available cache block is filled with data from the memory block. The type of operation from the second client operation request is then determined and the logical cache address is utilized.

Figure 10:
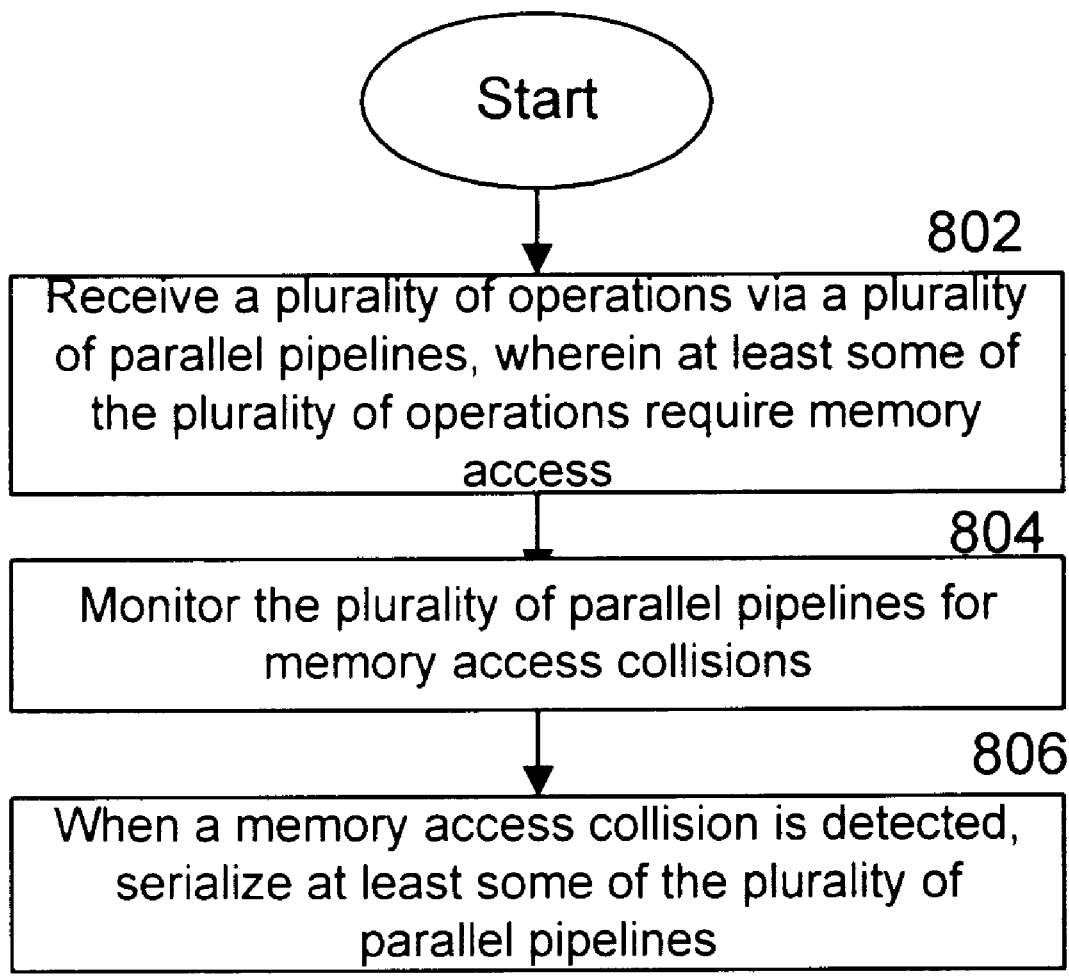
FIG. 10 illustrates a flow chart of a method for controlling parallel pipeline memory accesses in accordance with the present invention.

FIG. 10 illustrates a flow chart for controlling parallel pipeline memory accesses that may be performed by memory access control engine 202 and/or the video graphics circuit 404. The process begins at step 802 where a plurality of operations are received via a plurality of parallel pipelines, wherein at least some of the plurality of operations require memory access. At step 804, the plurality of parallel pipelines are monitored for memory access collisions. At step 806, when a memory access collision is detected, at least some of the plurality of pipelines are serialized. More specifically, an arbitration rule is applied to determine a serial order of the at least some of the plurality of pipelines. The plurality of operations are then provided to a plurality of buffer sets, wherein each of the plurality of buffer sets is associated with a corresponding one of the plurality of parallel pipelines. The plurality of buffer sets are monitored for parallel pipeline sequencing discrepancies and parallel pipeline processing of the plurality of buffer sets is adjusted when a parallel pipeline sequencing discrepancy is detected.

The foregoing discussion has described a method and apparatus for arbitrating access requests to a memory when contemporaneous accesses to an identical memory block of the memory occur. Further, the foregoing discussion has described a method and apparatus for controlling parallel pipeline memory accesses, which allows for the serialization of memory access requests, when a memory access collision is detected. It will thus be appreciated that those of ordinary skill in the art will be able to devise various arrangements which, although not explicitly described or shown herein, embody the principles of the present invention and are thus within its spirit and scope. For example, the cache memory 131 in FIG. 2 may be included in the memory access to control engine 202. Further, memory 295 in FIG. 3 may be included in the processing module 294 of the memory access control engine 202 or may be external to the memory access control engine 202. The arbitration performed in the cross check 502, described above, could be performed in an alternate manner and performed with fewer or additional clients. Still further, the arbitration could occur in an alternate area within the operation generator 240 or the memory access control engine 202. Additionally, the function of the deallocation buffer 258 could be included in the flush buffers 290a and 290b or in any other area that can retain the prior association of a memory block to a physical cache index until the operations related to a cache location identified by the physical cache index are completed. These and other memory management, arbitration, and processing techniques are within the spirit and scope of the present invention.

What is claimed is:

1. A method for arbitrating access requests to a memory, the method comprises the steps of:
   receiving client operation requests from a plurality of clients;
   determining whether a client operation request from a first client of the plurality of clients and a client operation request from a second client of the plurality of clients are contemporaneously requesting access to a memory block of memory;
   when the client operation request from the first client and the client operation request from the second client are requesting contemporaneous access to the memory block:
     arbitrating between the client operation request from the first client and the client operation request from the second client based on an arbitration rule to produce a first memory access request and a second memory access request;
     determining a first memory address from the first memory access request;
     translating the first memory address into a logical cache address, wherein the logical cache address relates to a physical cache location;
     determining whether the physical cache location contains data of the memory block;
     when the physical cache location does not contain the data of the memory block, setting a fill bit associated with the logical cache address;
     queuing the first memory access request, which includes the logical cache address, into a memory access queue to produce a first queued client operation;
     queuing the second memory access request into the memory access queue to produce a second queued client operation; and
     executing the first and second queued client operations in order of queuing.

2. The method of claim 1, wherein each client operation request is one of: a read operation request, a write operation request, and a read/write operation request.

3. The method of claim 1, wherein executing further comprises:
   determining whether the fill bit is set;
   when the fill bit is set, determining whether the physical cache location has an available cache block;
   when the physical cache location has an available cache block:
     filling the available cache block with data from the memory block and;
     executing the first and second queued client operations in order of queuing.

4. The method of claim 3, wherein executing the first and second queued client operations further comprises
   utilizing the logical cache address to access the physical cache location that contains the data of the memory block.

5. The method of claim 3, wherein filling the available cache block further comprises:
   generating a fill request;
   queuing the fill request in a fill request buffer; and
   executing fill requests in the fill request buffer.

6. The method of claim 5, wherein fill requests in the fill request buffer are executed before queued client operations in the memory access queue.

7. A memory access control engine comprises:
   a processing module; and
   instruction memory operably coupled to the processing module, wherein the instruction memory includes operational instructions that cause the processing module to:
     receive client operation requests from a plurality of clients;
     determine whether a client operation request from a first client of the plurality of clients and a client operation request from a second client of the plurality of clients are contemporaneously requesting access to a memory block of a data memory;
     when the client operation request from the first client and the client operation request from the second client are requesting contemporaneous access to the memory block:
       arbitrate between the client operation request from the first client and the client operation request from the the second client based on an arbitration rule to produce a first memory access request and a second memory access request;
       determine a first memory address from the first memory access request;
       translate the first memory address into a logical cache address, wherein the logical cache address relates to a physical cache location;
       determine whether the physical cache location contains data of the memory block;
       when the physical cache location does not contain the data of the memory block, set a fill bit associated with the logical cache address;
       queue the first memory access request, which includes the logical cache address, into a memory access queue to produce a first queued client operation;
       queue the second memory access request into the memory access queue to produce a second queued client operation; and
       execute the first and second queued client operations in order of queuing.

8. The memory access control engine of claim 7, wherein the processing module further functions to execute the first and second queued client operations by using
   the logical cache address to access the physical cache location that contains the data of the memory block.

9. The memory access control engine of claim 7, wherein the processing module executes the first and second queued client operations in a manner that includes:
   determining whether the fill bit is set;
   when the fill bit is set, determining whether the physical cache location has an available cache block;

when the physical cache location has an available cache block:
  filling the available cache block with data from the memory block; and
  executing the first and second queued client operations in order of queuing.

10. The memory access control engine of claim 9, wherein the processing modules performs the step of filling the available cache block in a manner that includes:
  generating a fill request;
  queuing the fill request in a fill request buffer; and
  executing fill requests in the fill request buffer.

11. The memory access control engine of claim 10, wherein the processing module executes fill requests in the fill request buffer before queued client operations in the memory access queue.

12. A method for controlling parallel pipeline memory accesses, the method comprises the steps of:
  receiving a plurality of operations via a plurality of parallel pipelines, wherein at least some of the plurality of operations require memory access, wherein each operation that requires memory access accesses a selected block of memory;
  for each operation of the plurality of operations:
    determining if the selected block of memory for the operation is stored in cache memory;
    when the selected block is not stored in the cache memory:
      generating a fill request corresponding to the selected block of memory; and
      queuing the fill request in a fill request buffer;
    queuing the operation in a memory command buffer;
  monitoring the plurality of parallel pipelines for memory access collisions;
  when a memory access collision is detected, serializing operations corresponding to the memory access collision by queuing the operations corresponding to the memory access collision sequentially within the memory command buffer to produce first and second queued operations, wherein queued operations in the memory command buffer are executed in order, wherein execution of fill requests queued in the fill request buffer occurs before execution of queued operations in the memory command buffer.

13. The method of claim 12, wherein serializing operations corresponding to the memory access collision further comprises
  applying an arbitration rule to determine queuing order of the operations corresponding to the memory access collision.

14. A computing system comprising:
  a plurality of client engines;
  main memory, wherein the main memory includes a plurality of memory blocks of data;
  cache memory operably coupled to the main memory, wherein the cache memory stores a portion of the memory blocks of the memory; and
  a memory access control engine operably coupled to the plurality of client engines, the cache memory, and the main memory, wherein the memory access control engine is coupled to the plurality of client engines via a plurality of parallel pipelines, wherein the memory access control engine includes:
    an operation generating module that is operably coupled to:
      receive a plurality of operations via the plurality of parallel pipelines, wherein at least some of the plurality of operations require access to data within the main memory;
      monitor the plurality of parallel pipelines for memory access collisions, wherein each memory access collision results from a first operation and a second operation attempting to access a selected memory block;
      when a memory access collision is detected, serialize some of the plurality of pipelines when a memory access collision the first and second operations for the memory access collision such that the first and second operations are not performed in parallel;
    a cache allocation module operably coupled to the operation generating module, wherein the cache allocation module receives a memory address for each of the at least some of the plurality of operations, wherein the cache allocation module produces a logical cache address from each memory address, wherein the logical cache address corresponds to a physical location of the cache;
    a plurality of buffer sets, wherein each buffer set of the plurality of buffer sets is associated with a corresponding pipeline of the plurality of parallel pipelines; and
    a command routing module operably coupled to the cache allocation module and the plurality of buffer sets, wherein the command routing module receives a command for each operation of the plurality of operations, wherein the command routing module stores each command in a selected buffer set of the plurality of buffer sets, wherein the selected buffer set is determined based on the logical cache address for the command.

15. The computing system of claim 14 wherein the operation generating module applies an arbitration rule to serialize the first and second operations.

16. The computing system of claim 14, wherein the cache allocation module determines, for each memory address received, if a memory block to which the memory address corresponds is currently stored in the cache memory, wherein when the memory block is not currently stored in the cache memory, the cache allocation module generates a fill request.

17. The computing system of claim 16, wherein each of the buffer sets of the plurality of buffer sets includes a memory command buffer that stores commands corresponding to operations and a fill request buffer that stores fill requests corresponding to operations.

* * * * *